United States Patent [19]

Stenneler et al.

[11] Patent Number: 4,787,820
[45] Date of Patent: Nov. 29, 1988

[54] TURBINE PLANT COMPRESSOR DISC WITH CENTRIPETAL ACCELERATOR FOR THE INDUCTION OF TURBINE COOLING AIR

[75] Inventors: Jacques M. P. Stenneler, Le Chatelet En Brie; Jacky Naudet, Evry, both of France

[73] Assignee: Societe Nationale D'Etude Et De Construction De Moteurs D'Aviation "S.N.E.C.M.A.", Paris, France

[21] Appl. No.: 140,992

[22] Filed: Jan. 5, 1988

[30] Foreign Application Priority Data

Jan. 14, 1987 [FR] France ............... 87 00313

[51] Int. Cl.⁴ .......................................... F01D 5/08
[52] U.S. Cl. ...................... 416/95; 416/90 R; 416/214 A; F01D/5/08
[58] Field of Search ............ 416/90 R, 95, 214 A; 60/726

[56] References Cited

U.S. PATENT DOCUMENTS

| | | | |
|---|---|---|---|
| 3,085,400 | 4/1963 | Sonder et al. | 416/95 X |
| 3,609,059 | 9/1971 | Wagle | 416/95 |
| 3,632,221 | 1/1972 | Uehling | 416/95 X |
| 3,897,168 | 7/1975 | Amos | 416/95 X |
| 4,008,977 | 2/1977 | Brown et al. | 416/95 X |
| 4,231,704 | 11/1980 | Ayache et al. | 416/95 |
| 4,415,310 | 11/1983 | Bouiller et al. | 416/95 |
| 4,595,339 | 6/1986 | Naudet | 416/95 |

FOREIGN PATENT DOCUMENTS

| | | | |
|---|---|---|---|
| 0049655 | 4/1982 | European Pat. Off. | |
| 1144537 | 2/1963 | Fed. Rep. of Germany | 416/95 |
| 966804 | 10/1950 | France | 416/95 |
| 1248916 | 11/1960 | France . | |
| 1250210 | 11/1960 | France . | |
| 1587639 | 3/1970 | France . | |
| 2292866 | 6/1976 | France . | |
| 2401320 | 3/1979 | France . | |
| 2552164 | 3/1985 | France . | |
| 113905 | 7/1982 | Japan | 416/95 |
| 247801 | 11/1986 | Japan | 416/95 |
| 204331 | 8/1939 | Switzerland | 416/95 |
| 712051 | 7/1954 | United Kingdom | 416/95 |

*Primary Examiner*—Everette A. Powell, Jr.
*Attorney, Agent, or Firm*—Oblon, Fisher, Spivak, McClelland & Maier

[57] ABSTRACT

A turbine plant compressor disc is formed from two halves which are welded together near the rim and define an internal cavity in which a centripetal accelerator is mounted for inducing cooling air to flow from the compressor through inclined passages in the rim on the downstream side of the blades carried by the rim, through the cavity of the disc, and towards the turbine to be cooled in the vicinity of the turbine shaft. The centripetal accelerator is composed of sectors which are removably mounted in the cavity of the disc, the sectors forming a perforated ring disposed in the central bore of the disc and each sector having a flat web extending radially outwards in the inner cavity of the disc to form radial centripetal channels communicating with the air passages in the rim.

5 Claims, 2 Drawing Sheets

TURBINE PLANT COMPRESSOR DISC WITH CENTRIPETAL ACCELERATOR FOR THE INDUCTION OF TURBINE COOLING AIR

BACKGROUND OF THE INVENTION

1. Field of the Invention

The present invention relates to a turbine plant compressor disc provided with a centripetal accelerator for the induction of turbine cooling air from the compressor.

2. Summary of the Prior Art

In engines cooled through the inside of the high pressure compressor rotor, the cooling air intended for the turbine discs and blades is generally taken from the flow path of the compressor through holes drilled in the rings of the compressor drum, and then directed towards the turbine through the inside of the drum.

These drilled holes suffer from the drawback of introducing bending stresses which limit the maximum radius of the ring which is acceptable. Such an arrangement is shown in French Patent No. 1 248 916. Bores are made in the rings of the drum between two discs, and air guide means in the form of a quadrant having a central rib is screwed or rivetted under the rings. This makes it necessary to drill, in addition to the holes for taking the cooling air, holes for the screws or rivets which further increase the bending stresses suffered by the drum, making more critical the employment of hammer fastening blades on the stages of the rotor.

Furthermore, the substantial mass of such fastenings would lead to excessive centrifugal stresses on the rim of a two-part compressor disc and would tend to move the two halves of the disc apart. The possibility of siting the ring as high as possible permits an effective bracing of the discs which opposes the separation of the disc-halves.

To avoid these drawbacks, European Patent No. 0 049 655 proposes a gas turbine cooling arrangement in which the turbine cooling air is taken in the plane of the disc carrying the compressor blades through bores situated in the platforms of the hammer fastening blades themselves.

The reduction of bending stresses resulting therefrom makes it possible to raise the drum fastenings on the disc to a radial level close to the rim. This arrangement is particularly advantageous to discs made up of two halves welded at the rim and permits the use of hammer-root blades which are often heavier but less expensive than the standard blades with pins. However, it has been observed that the presence of fins on the inside of each disc-half introduces asymmetrical centrifugal stresses which, in turn, bring about deformations of the disc-halves and may in the end cause a rupture of the disc in the region of the rim welding.

French Patent No. 2 552 164 proposes a solution to this problem by the use of a centripetal accelerator which has several sectors mounted in a removable manner in the space provided between the two halves of the compressor disc, each sector being made up of two half-shells having on their inner face ribs in the form of centripetal vanes by means of which the half-shells are assembled.

Using vanes which are not integral with the faces of the disc makes it possible to obtain smooth inner faces of the disc-halves. As a result, the two faces are substantially symmetrical and the centrifugal stresses are balanced.

However, it is a drawback of this arrangement that it does not permit supply of air through the rim of the disc from the space situated under the blade platforms, as the sectors of the accelerator extend inside the disc right out to the rim, which makes it necessary to take air in the central plane of the disc. Taking air in this way is not satisfactory as secondary stray flows cause pressure disturbance, and it is therefore preferable to take air downstream of the blades.

It is an object of the present invention to simplify the above described arrangements without exhibiting their drawbacks and to permit the taking of air downstream of the blades.

A further object of the invention is to provide a compressor disc with a centripetal accelerator in a form sufficiently simple to permit its easy construction in composite materials in order to achieve a reduction of mass overall.

SUMMARY OF THE INVENTION

To this end, according to the invention there is provided a turbine plant compressor disc provided with an integrated centripetal accelerator for the induction of turbine cooling air from the compressor, wherein said disc is formed by two disc-halves disposed upstream and downstream with respect to the axis of rotation of said disc, said disc-halves being secured together to define an internal space therebetween in a plane of said disc perpendicular to said disc axis and having inner faces bounding said internal space, said disc having means defining a central bore through said disc, an outer peripheral rim for forming part of a compressor drum and adapted to receive the roots of a peripheral array of compressor blades, and a plurality of peripherally spaced air off-take passages through said rim on the downstream side of said disc, and wherein said centripetal accelerator comprises a plurality of sectors removably mounted in said internal space of said disc and forming a perforated circular member disposed in said central bore of said disc, each of said sectors having a flat web extending radially outwards in said internal space of said disc, and each pair of adjacent webs forming with said inner faces of said disc-halves a radial channel communicating with one of said air off-take passages in said rim of said disc.

DESCRIPTION OF THE PREFERRED EMBODIMENTS

Figure 1:
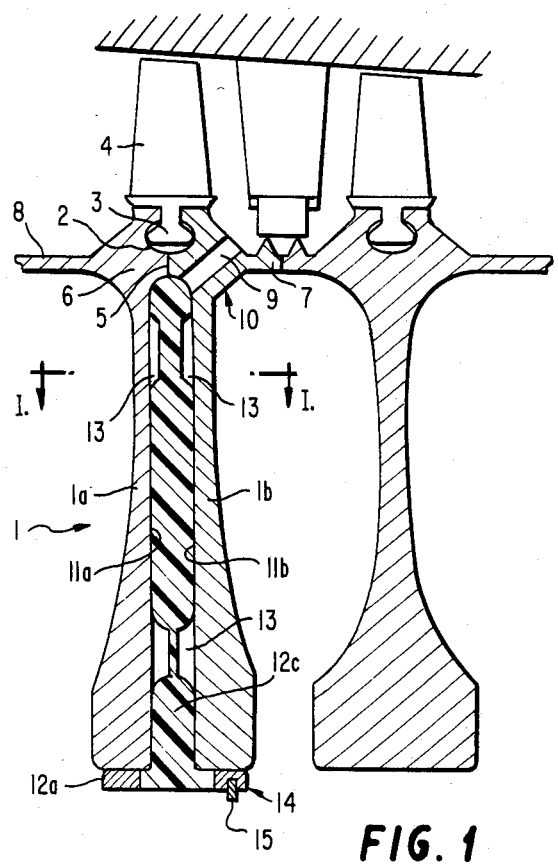
FIG. 1 is a half axial section through part of a turbine plant compressor showing one embodiment of a disc incorporating a centripetal accelerator in accordance with the invention.

FIG. 1 shows a compressor disc 1 having around its outer periphery a circular groove 2 in which the hammer fastenings 3 of blades 4 are engaged.

The compressor disc 1 is formed by two disc halves 1a, 1b which have symmetrical flanks and which are welded together at 5 in a known manner at the rim 6, the rim being extended by bracing rings 7,8 subsequently welded to corresponding rings of adjacent discs to form the drum of the compressor.

The rim portion of the downstream disc-half 1b is provided with a plurality of peripherally spaced air off-take bores 9 extending parallel to the generatrix of a frusto-conical surface 10 on the inner downstream side of the rim. At their outer ends the bores 9 communicate with the space outwardly of the compressor drum but inwardly of the platforms of the blades 4, and on the downstream side of the blades. The inner ends of the bores 9 open into the space defined between the inner faces 11a,11b of the two disc-halves, and in which a centripetal accelerator is mounted.

This accelerator is formed from several sectors 12, each of which comprises an H-shaped ring portion having two arcuate "legs" 12a and a cross-part 12b provided with a radial extension 12c in the form of a flat web having a length substantially equal to the radial extent of the inner cavity defined by the two disc halves 1a,1b. The inner faces of the disc halves have evenly distributed radial grooves 13 machined along the whole or part of the radial height of the cavity for receiving the edges of the sector webs 12c.

The downstream leg 12a of each sector 12 has in its inner face an arcuate groove 14 for the insertion of a split segment 15 for locking all the sectors together in a ring.

The assembly of the centripetal accelerator is effected by inserting each sector 12 into the cavity of the disc, the webs 12c being guided in the corresponding grooves 13 of the disc-halves until the arcuate ring portions 12a bear upon the central bore of the disc. After all the sectors have been placed in position, the assembly is locked by means of a split segment 15 which is inserted by sliding into the annular groove formed by the grooves 14.

Each pair of adjacent webs 12c thus form, together with the inner sides 11a,11b of the disc-halves, a radial centripetal acceleration channel for the air taken in through the openings 9, the air thus accelerated being directed downstream towards the turbine in the vicinity of the turbine shaft.

Figure 4:
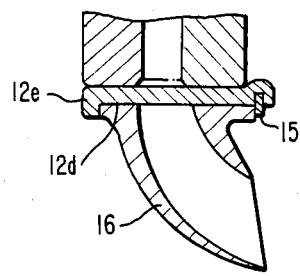
FIG. 4 is a partial sectional view of the radially inner part of an alternative embodiment of the compressor disc according to the invention.
Figure 2:
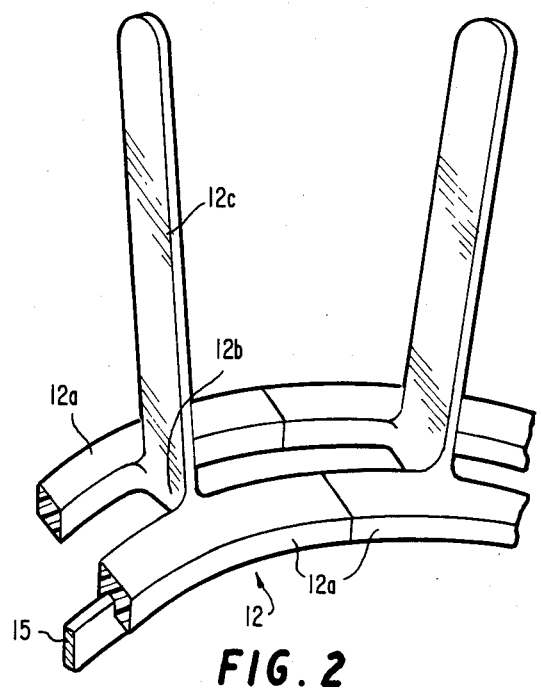
FIG. 2 is a perspective view of two adjacent sectors of the centripetal accelerator in the embodiment of FIG. 1.
Figure 3:
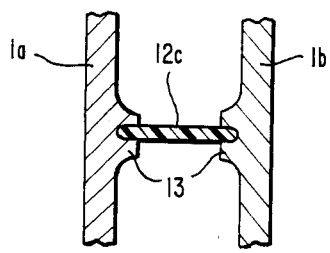
FIG. 3 is a partial section along the line I—I in FIG. 1.

In the alternative embodiment of FIG. 4, the inner circular face 12d of the ring formed by the sectors 12 receives an annular member 16 forming a deflector for directing the flow of air downstream from the outlet of the centripetal accelerator. In this case the upstream edge of the upstream leg 12a of each sector 12 has an arcuate flange 12e against which the deflector 16 bears, and the deflector is locked in position on the downstream side by a split segment 15 engaging the sectors 12 as in the preceding embodiment.

The simplicity of the shape of the sectors permits making them in a composite material, thus making the accelerator assembly lighter.

What is claimed is:

1. A turbine plant compressor disc provided with an integrated centripetal accelerator for the induction of turbine cooling air from the compressor, wherein said disc is formed by two disc-halves disposed upstream and downstream with respect to the axis of rotation of said disc, said disc-halves being secured together to define an internal space therebetween in a plane of said disc perpendicular to said disc axis and having inner faces bounding said internal space, said disc having means defining a central bore through said disc, an outer peripheral rim for forming part of a compressor drum and adapted to receive the roots of a peripheral array of compressor blades, and a plurality of peripherally spaced air off-take passages through said rim on the downstream side of said disc, and wherein said centripetal accelerator comprises a plurality of sectors removably mounted in said internal space of said disc and forming a perforated circular member disposed in said central bore of said disc, each of said sectors having a flat web extending radially outwards in said internal space of said disc, and each pair of adjacent webs forming with said inner faces of said disc-halves a radial channel communicating with one of said air off-take passages in said rim of said disc.

2. Compressor disc according to claim 1, wherein each of said disc-halves has radial grooves machined on said inner face thereof, and said radially extending webs are received in said grooves to hold said webs in their radial positions.

3. Compressor disc according to claim 1, wherein said circular member formed by said sectors has a circular groove in the inner face thereof adjacent its downstream edge, and said centripetal accelerator includes a split segment which is received in said circular groove for locking said sectors together.

4. Compressor disc according to claim 1, wherein said centripetal accelerator includes an annular member positioned adjacent the inner face of said circular member formed by said sectors for deflecting downstream the flow of air from the outlet of said centripetal accelerator.

5. Compressor disc according to claim 1, wherein said rim of said disc has a circumferential groove for receiving hammer fastenings of said blades, and said downstream disc-half has a frusto-conical inner edge portion of said rim, said air offtake passages extending through said rim parallel to the generatrix of said frusto-conical inner edge portion.

* * * * *